United States Patent
Saitoh et al.

(10) Patent No.: US 7,365,867 B2
(45) Date of Patent: Apr. 29, 2008

(54) IMAGE PROCESSING DEVICE AND RECEIVED DOCUMENT SORTING CONTROL METHOD FOR SAME

(75) Inventors: Kazutaka Saitoh, Iwatsuki (JP); Yoshihiro Maei, Iwatsuki (JP); Yoshiharu Sagiya, Iwatsuki (JP); Hideki Fujii, Iwatsuki (JP); Hirotaka Kawabata, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 943 days.

(21) Appl. No.: 10/645,905

(22) Filed: Aug. 22, 2003

(65) Prior Publication Data

US 2004/0051896 A1 Mar. 18, 2004

(30) Foreign Application Priority Data

Sep. 18, 2002 (JP) .............................. 2002-272084

(51) Int. Cl.
*G06F 15/00* (2006.01)
*G06K 1/00* (2006.01)
(52) U.S. Cl. .................. 358/1.13; 358/1.1; 358/1.15; 358/1.12; 358/402; 707/500
(58) Field of Classification Search .............. 358/1.12, 358/1.15, 1.1, 1.13, 402; 707/500
See application file for complete search history.

(56) References Cited

U.S. PATENT DOCUMENTS

| 6,914,687 | B1 * | 7/2005 | Hosoda et al. ............... 358/1.1 |
| 7,106,461 | B2 * | 9/2006 | Kakigi et al. .............. 358/1.12 |
| 7,161,697 | B2 * | 1/2007 | Yajima ..................... 358/1.15 |
| 2002/0198904 | A1 * | 12/2002 | Robles et al. .............. 707/500 |
| 2003/0184796 | A1 * | 10/2003 | Kokubo et al. ............ 358/1.15 |
| 2005/0225809 | A1 * | 10/2005 | Tonegawa .................. 358/402 |
| 2005/0275871 | A1 * | 12/2005 | Baird et al. ............... 358/1.15 |

FOREIGN PATENT DOCUMENTS

| JP | A-07-288543 | 10/1995 |
| JP | A-07-288602 | 10/1995 |
| JP | A-09-247336 | 9/1997 |
| JP | A-11-313180 | 11/1999 |
| JP | 2001-313750 | 11/2001 |
| JP | A-2002-124972 | 4/2002 |
| JP | A 2002-135552 | 5/2002 |
| JP | 2002-359645 | * 12/2002 |

* cited by examiner

*Primary Examiner*—Thomas D. Lee
*Assistant Examiner*—Satwant Singh
(74) *Attorney, Agent, or Firm*—Oliff & Berridge, PLC (57) ABSTRACT

A received document sorting control method for an image processing device that has a facsimile communication unit for communications via Internet, and receives documents by means of the facsimile communication unit, comprising: previously setting prescribed condition information for judging whether or not a received document is subject to automatic sorting, and for judging a prescribed sorting method in a case that automatic sorting is to be implemented; and checking contents of transmission identification information transmitted by a sender on the basis of the prescribed condition information, and controlling automatic sorting processing for a document received in a communication, in accordance with the corresponding prescribed sorting method, if the document received in the communication is judged to be subject to the automatic sorting.

22 Claims, 12 Drawing Sheets

| | Organization Name / Domain Name Check List | | | |
|---|---|---|---|---|
| | Organization Name / Domain Name | Sort Category | Parameter | Incoming Call Report Recipient |
| 1 | Fujixrox.co.jp | Transfer to BOX | 001 | — |
| 2 | Fujifirm.co.jp | Transfer to OUTPUT | Side Tray | — |
| 3 | Fx | Transfer to PC | Transfer Destination : Main | Report Recipient : Sub1 |
| . | ... | ... | ... | ... |
| . | ... | ... | ... | ... |

FIG. 5C

| | Telephone Number Check List | | | |
|---|---|---|---|---|
| | Telephone Number | Sort Category | Parameter | Incoming Call Report Recipient |
| 1 | 050-1111-2222 | Transfer to BOX | 001 | — |
| 2 | 050-1111-3333 | Transfer to OUTPUT | Side Tray | — |
| 3 | 050-1111-4444 | Transfer to PC | Transfer Destination : Main | Report Recipient : Sub1 |
| · | : | : | : | : |
| · | : | : | : | : |

You have received an urgent fax.
The fax is stored in XXXXXXXXXX.

| Sorting Registration List for Documents of High Urgency ||| 
|---|---|---|
| Sort Category | Transfer Destination | Incoming Fax Report Recipient |
| Transfer to PC | Transfer Destination Main Address : ftp://ftp.example.net/pub/users | Incoming Fax Report Recipient Main Address : User Name@Domain Name |

IMAGE PROCESSING DEVICE AND RECEIVED DOCUMENT SORTING CONTROL METHOD FOR SAME

BACKGROUND OF THE INVENTION

1. Field of the Invention

The present invention relates to an image processing device having a facsimile communication unit for communications via the Internet, which receives documents by means of the facsimile communication unit, and more particularly, to an image processing device which is capable of automatically sorting received documents in facsimile communications via the Internet, by means of a method desired by the receiving side.

2. Description of the Related Art

Conventionally, a communication terminal device has been known which is capable of sorting and storing reception data into desired data boxes, according to the wishes of the recipient (see, for example, Japanese Patent Application Laid-open No. 2002-135552).

More specifically, the communication terminal device performs box sorting according to the transmission identification information (terminal identification signal, or telephone number reported by exchange by means of caller telephone number notification service) or according to the called number information (called number information reported by the network in the case of a communication using a Dial in service), and is applicable to facsimile communication devices, performing G3 facsimile communications by connecting to a telephone network, or G3/G4 facsimile communications by connecting to an ISDN network, or the like.

In recent years, with the rapidly advancing shift from telephone networks to IP networks, image processing devices performing Internet facsimile communications by means of procedures based on ITU-T T37 and ITU-T T38 have been developed, and there has also been a tendency for communication terminal devices to convert to IP compatibility.

A function for sorting received documents allows savings in the work involved in transferring a received document to the appropriate recipient, as well as being valuable from the viewpoint of privacy, but in the case of Internet facsimile communications, with a conventional communication terminal device as described above, it is not possible to use the identification information for determining the box sorting process, and hence a sorting process cannot be performed using the disclosed technology.

As described above, at present, in a conventional facsimile communication device, there exists no method for performing sorting of received documents in the case of facsimile communications via the Internet.

Therefore, the present invention has been made in view of the above circumstances, and provides an image processing device and a received document sorting control method for same, whereby received documents can be sorted automatically by means of a method designated by the recipient side, in the case of facsimile communications via the Internet.

SUMMARY OF THE INVENTION

An aspect of the invention is a received document sorting control method for an image processing device that has a facsimile communication unit for communications via Internet, and receives documents by means of the facsimile communication unit, comprising: previously setting prescribed condition information for judging whether or not a received document is subject to automatic sorting, and for judging a prescribed sorting method in a case that automatic sorting is to be implemented; and checking contents of transmission identification information transmitted by a sender on the basis of the prescribed condition information, and controlling automatic sorting processing for a document received in a communication, in accordance with the corresponding prescribed sorting method, if the document received in the communication is judged to be subject to the automatic sorting.

Another aspect of the invention is an image processing device that has a facsimile communication unit for communications via Internet, and receives documents by means of the facsimile communication unit, comprising: a setting unit that previously sets prescribed condition information for judging whether or not a received document is subject to automatic sorting, and determines a prescribed sorting method if automatic sorting is to be performed; a storing unit that stores transmission identification information transmitted by a sender; a judging unit that checks contents of the transmission identification information stored in the storing unit on the basis of the set prescribed condition information, and judges whether or not a document received in a communication is subject to automatic sorting; and a received document sorting control unit that controls automatic sorting processing for the document received in the communication, in accordance with the corresponding prescribed sorting method, if it is judged by the judging unit that the document received in the communication is subject to automatic sorting.

According to the present invention, since prescribed condition information is previously set for determining whether or not a received document is subject to automatic sorting, as well as determining a prescribed sorting method in the case that automatic sorting is to be implemented, and since the contents of the transmission identification information transmitted by the sender are checked on the basis of the set prescribed condition information and automatic sorting processing for a document received in a communication is controlled in accordance with the corresponding prescribed sorting method, if it is judged that the document received in the communication is subject automatic sorting, then documents received in facsimile communications via the Internet can be sorted automatically in accordance with a method specified by the recipient side, and it is therefore possible to lighten the sorting work load on human operators.

BRIEF DESCRIPTION OF THE DRAWINGS

Preferred embodiments of the present invention will be described in detail based on the following figures, wherein.

DESCRIPTION OF THE PREFERRED EMBODIMENTS

Below, embodiments of the present invention are described in detail with reference to the accompanying drawings.

Figure 1:
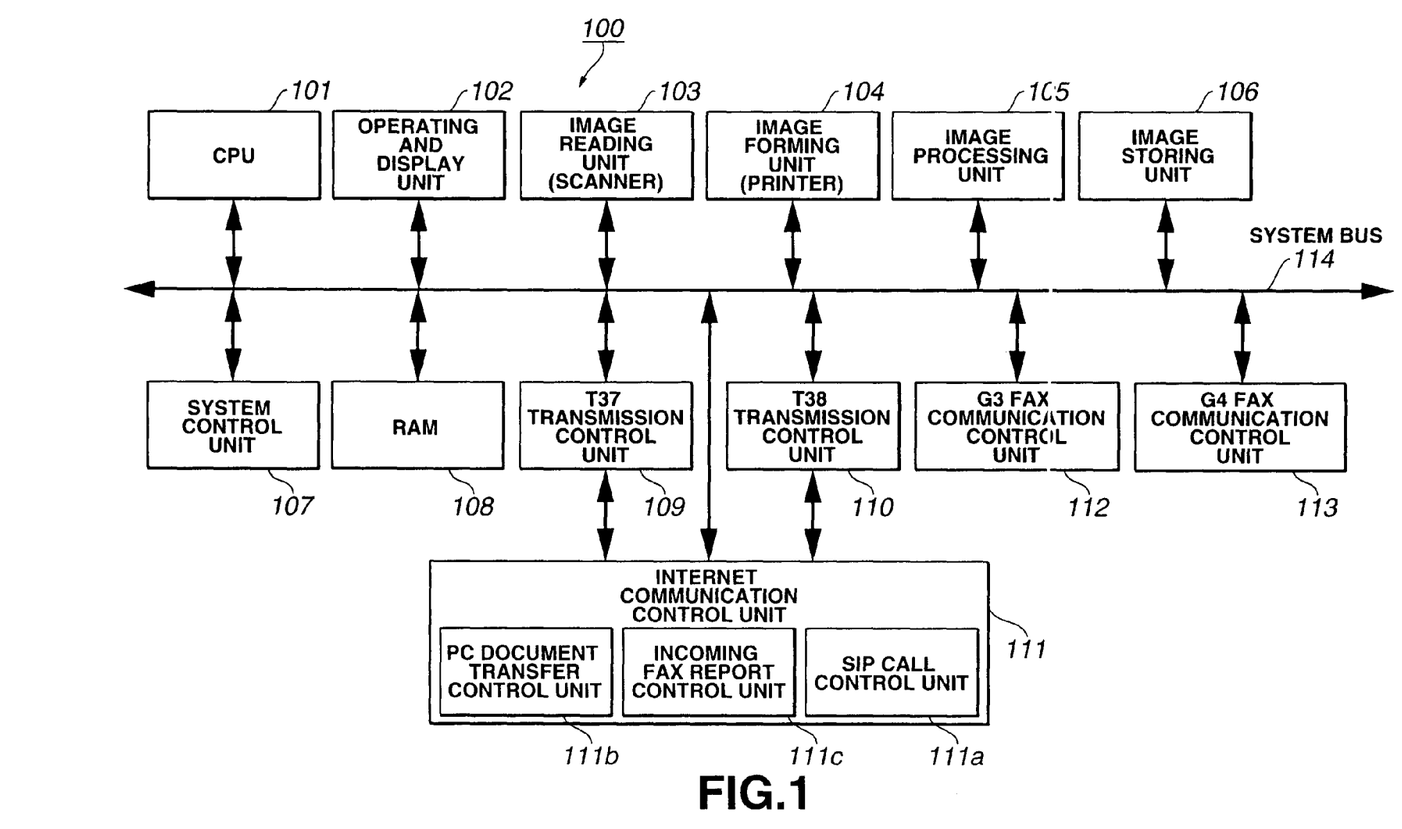
FIG. 1 is a block diagram showing the system composition of a composite device having a facsimile transmission function in which an image processing device relating to the present invention is applied.

FIG. 1 is a block diagram showing the system composition of a composite device 100 having a facsimile transmission function in which an image processing device relating to the present invention is applied.

As shown in FIG. 1, this composite device 100 is constituted by: a main control unit (CPU) 101, an operating unit 102, an image reading unit (scanner) 103, an image forming unit (printer) 104, an image processing unit 105, an image storing unit 106, a system control unit 107, a RAM 108, a T37 transmission control unit 109, a T38 transmission control unit 110, an Internet communication control unit 111, a G3 transmission control unit 112, and a G4 transmission control unit 113, all of these elements being connected to a system bus 114.

Here, the main control unit (CPU) 101 performs a variety of calculation processes in the composite device 100.

The operating and display unit 102 has an operating unit and a display unit whereby the user can make various settings in the composite device 100. For example, in the present embodiment, the respective setting screens described below are displayed, and various settings are instructed by the user according to the setting screen. Moreover, it is also used when registering the check list data described hereinafter.

The image reading unit 103 is a scanner which reads in and inputs an original, or the like, set in position by the user.

The image forming unit 104 is a printer for performing printing onto printing paper, or the like, on the basis of image data input by the image reading unit 103, or image data received by facsimile communications, by means of the T37 transmission control unit 109, T38 transmission control unit 110, G3 FAX communication control unit 112, G4 FAX communication control unit 113, or the like, as described hereinafter.

The image processing unit 105 performs various types of image processing of the input image data.

The image storing unit 106 stores image data input by the image reading unit 103, or image data received by facsimile communications, by means of the T37 transmission control unit 109, T38 transmission control unit 110, G3 FAX communication control unit 112, G4 FAX communication control unit 113, or the like, as described hereinafter.

The system control unit 107 performs overall control of the composite device 100.

The RAM 108 stores system data and various information for controlling the operations of the composite device 100. In the present embodiment, it stores setting information set on the various setting screens described hereinafter, and check list data, and the like.

The T37 transmission control unit 109 controls Store & Forward type communication protocols in accordance with the procedure in ITU-T (the Telecommunication Standardization Sector of the International Telecommunication Union) Recommendation T37.

The T38 transmission control unit 110 controls Real type communication protocols in accordance with the procedure in ITU-T Recommendation T-38.

The Internet communication control unit 111 controls the exchange of various data via the Internet, by means of the T37 transmission control unit 109 and the T38 transmission control unit 110. The Internet communication control unit 111 has a SIP (Session Initiation Protocol) call control unit 111a, a PC document transfer control unit 111b, and an incoming fax report control unit 111c. Here, the SIP (Session Initiation Protocol) call control unit 111a establishes, maintains and terminates calls based on Real Time Internet FAX T38, by using the procedures stipulated in RFC3261(SIP) and RFC2327(SDP) of the IETF (Internet Engineering Task Force). Moreover, the PC document transfer control unit 111b controls transfer of documents to the PC via the Internet. Furthermore, the incoming fax report control unit 111c controls the issuing of incoming fax reports to a mobile device.

The G3 transmission control unit 112 controls communication protocols conforming to G3 facsimile communication procedures.

The G4 transmission control unit 113 controls communication protocols conforming to G4 facsimile communication procedures.

The system bus 114 is connected to the respective constituent elements 101-113 described above, and performs transfer of various data, such as control signals, image data, and the like.

Next, the processing operations ((1)-(3)) of the present invention using the composition described above shall be described.

(1) Firstly, a case where automatic sorting of received documents is controlled in accordance with reported transmission identification information (information, such as user name, organization name/domain name, telephone number, or the like), in an image processing device which performs facsimile communications via the Internet, shall be described with reference to FIG. 2 to FIG. 6.

Figure 2:
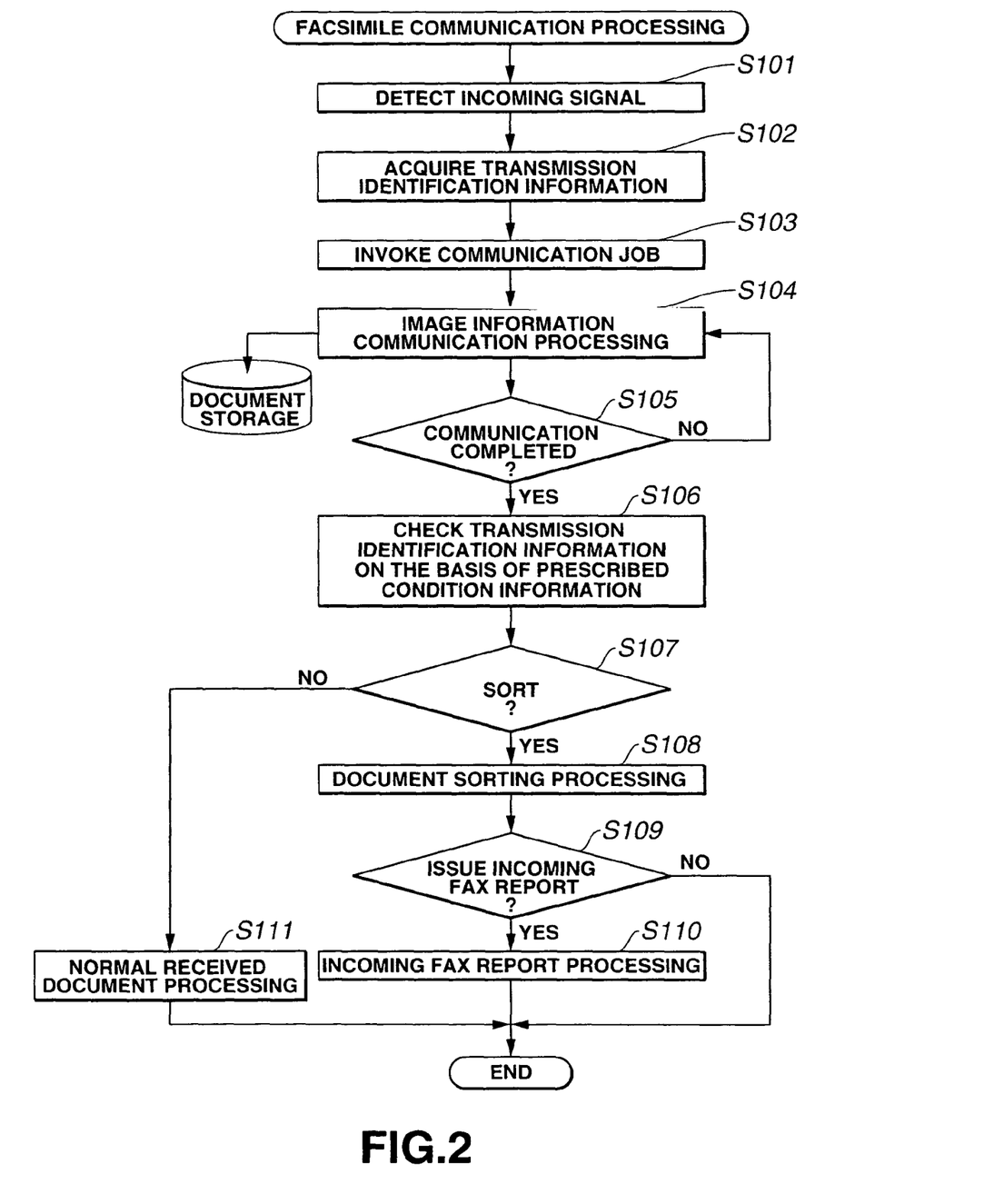
FIG. 2 is a flowchart of a procedure of processing operations for an Internet facsimile communication, in a case where automatic sorting of a document received in the communication in question is carried out in accordance with the transmission identification information transmitted by the sender.

FIG. 2 describes a procedure of processing operations for an Internet facsimile communication, in a case where automatic sorting of a document received in the communication in question is carried out in accordance with the transmission identification information (information such as user name, organization name/domain name, telephone number, or the like) transmitted by the sender.

Figure 3:
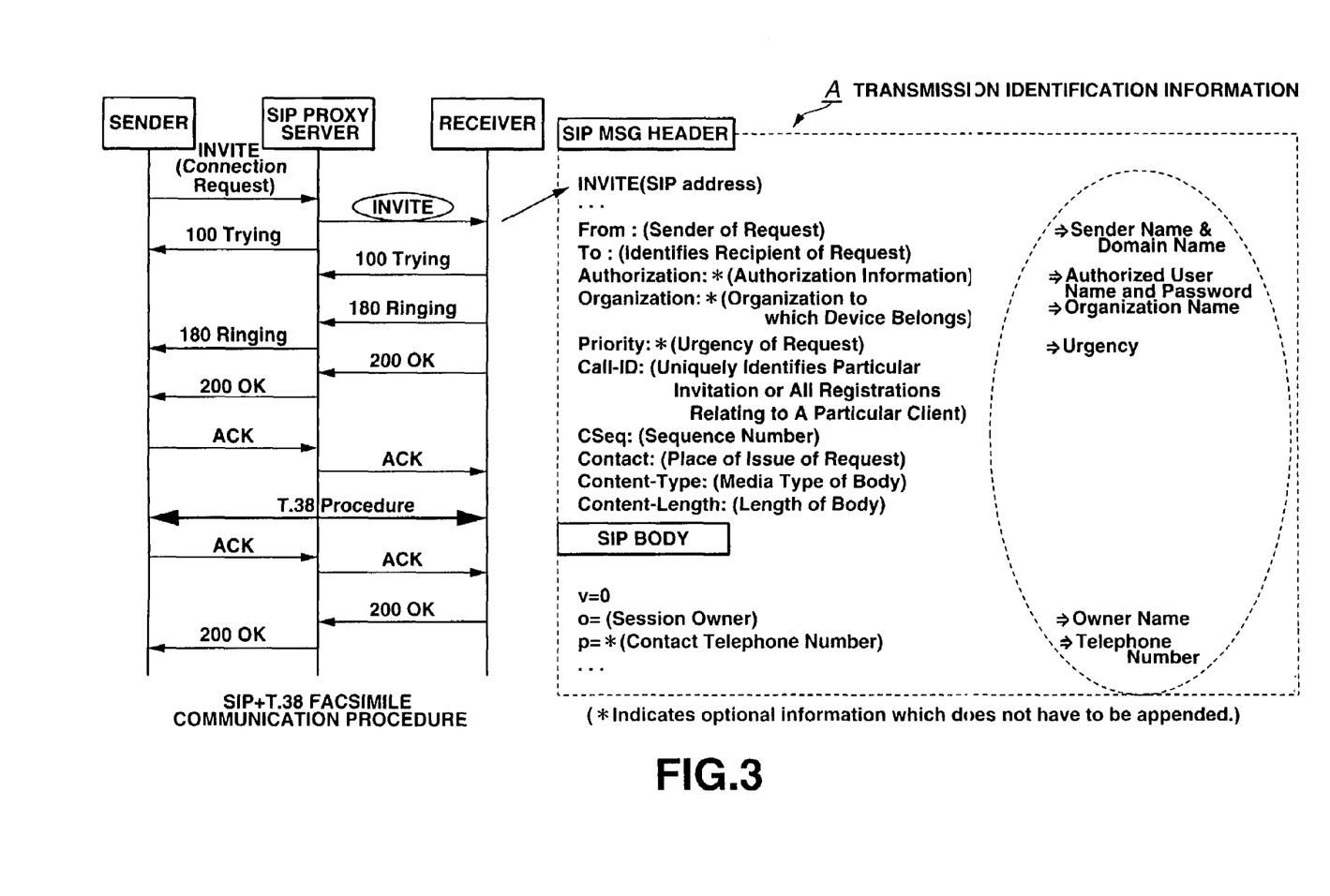
FIG. 3 illustrates a method for extracting transmission identification information transmitted by the sender.

As illustrated in FIG. 2, in this processing, firstly, when the Internet communication control unit 111 detects an incoming signal (step S101), then the reported transmission identification information is analysed and stored in the RAM 107 (step S102). FIG. 3 illustrates a method for extracting the transmission identification information.

Thereupon, the system control unit 106 invokes a communication job (step S103), and image information communication processing is carried out (step S104). In this process, the received document is stored in the image storing unit 106.

Thereupon, when the communication has completed (YES at step S105), the transmission identification information is checked on the basis of designated condition information, in accordance with control performed by the system control unit 106 (step S106).

As a result of this check, it is judged whether or not sorting processing is to be carried out for the document received in this communication, and if it is judged to carry out sorting processing, then prescribed sorting processing is implemented for the received document (step S108).

Figure 4:
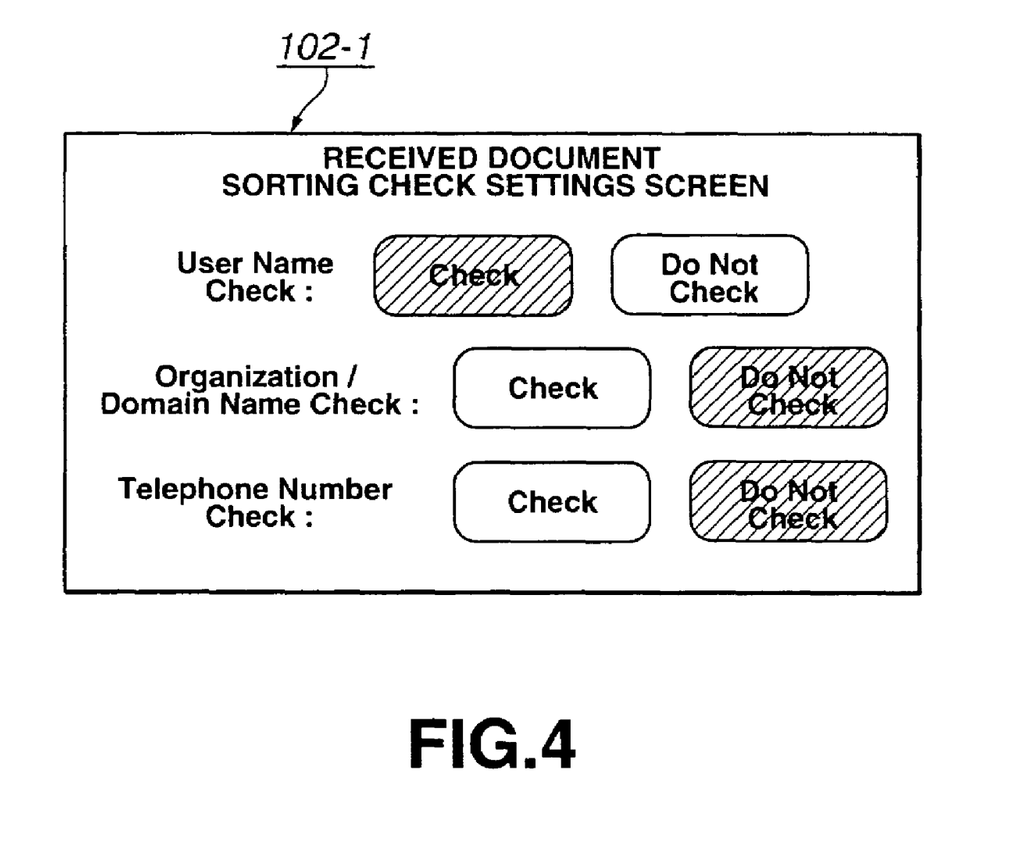
FIG. 4 shows one example of the composition of a "received document sorting check setting screen"
Figure 5A:
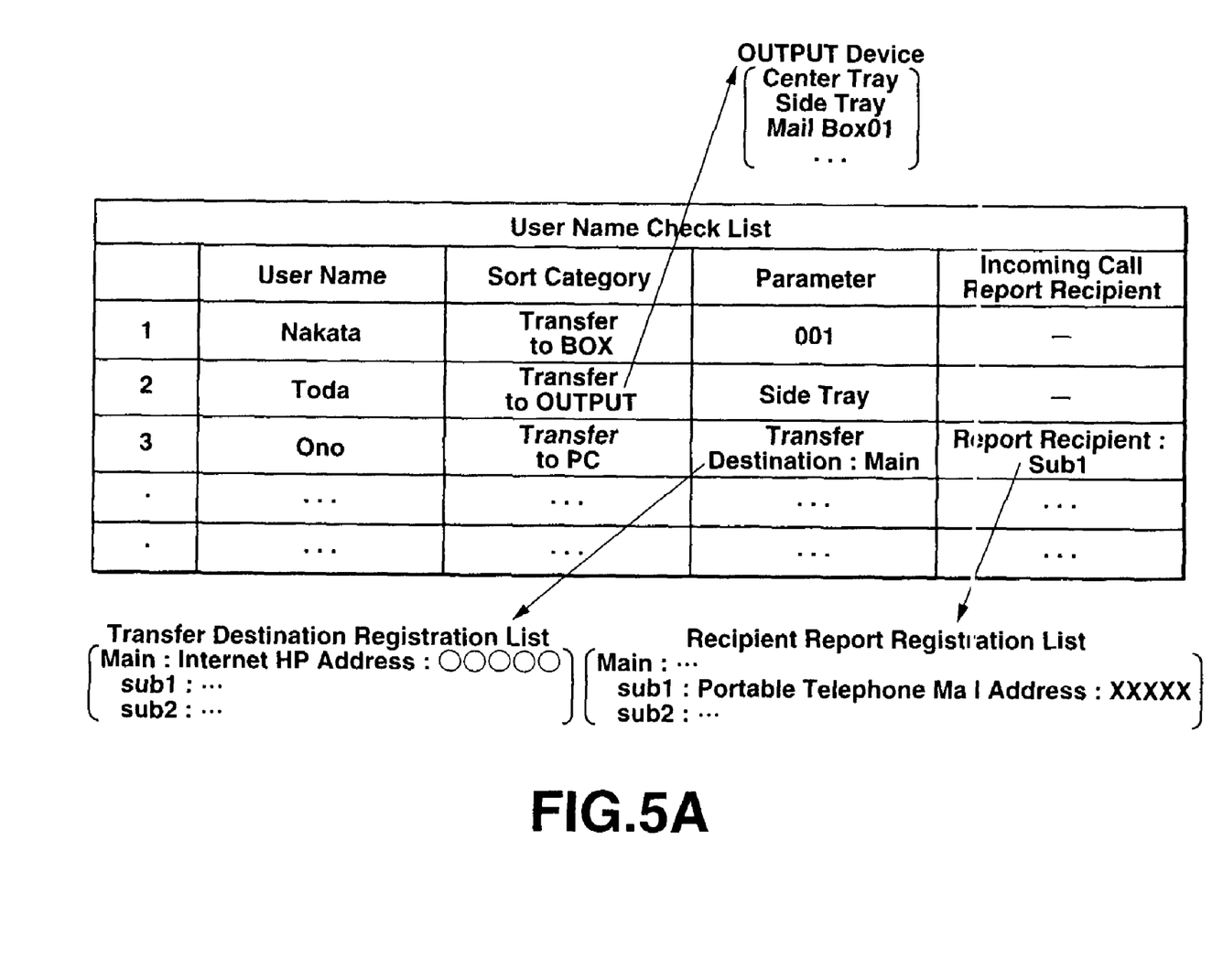
FIGS. 5A, 5B and 5C illustrate examples of the composition of registration check lists.
Figure 5B:
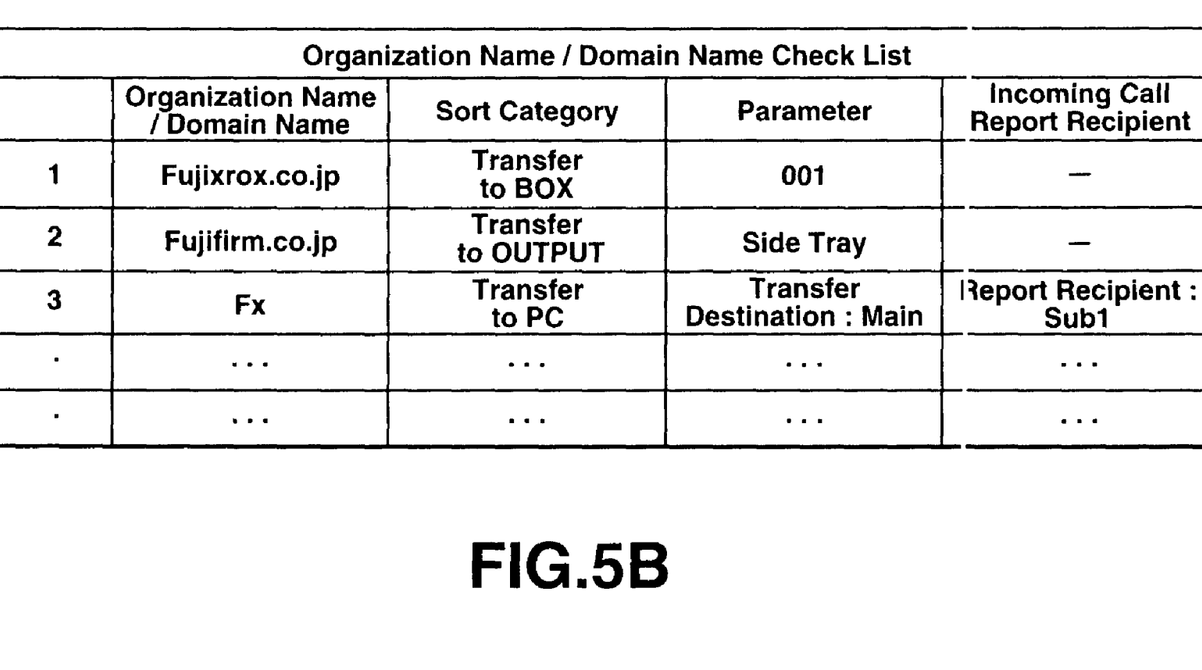
Figure 5C:
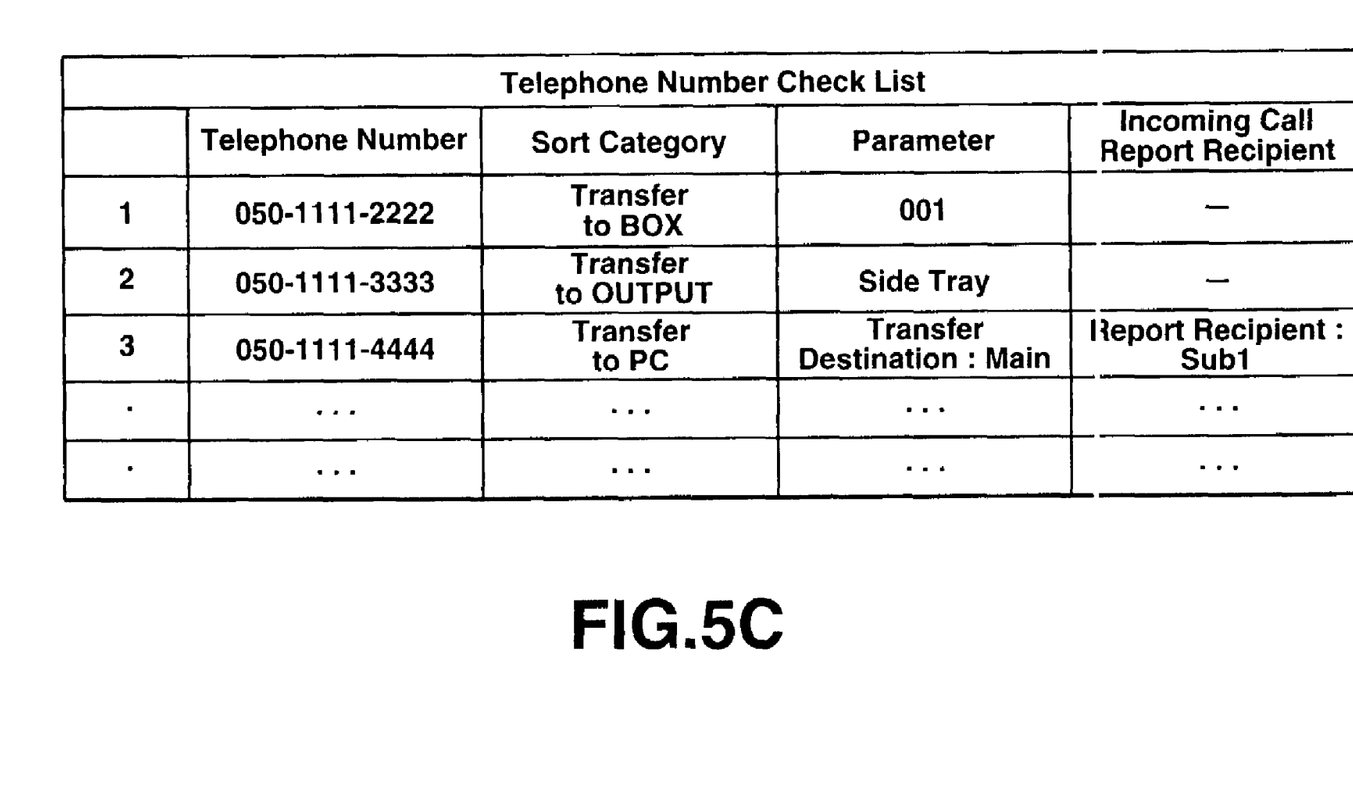
Figure 6:
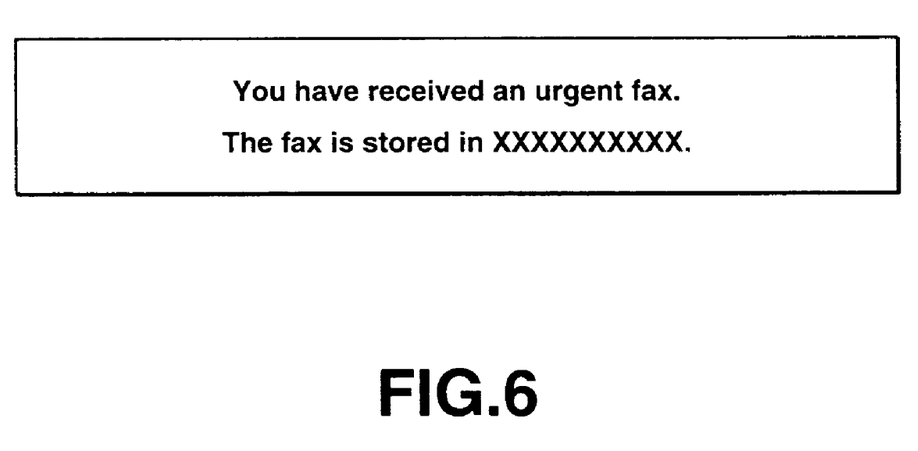
FIG. 6 illustrates one example of the composition of the contents of an incoming fax report.

More specifically, check items designated by the user on the received document sorting check settings screen 102-1 illustrated in FIG. 4 are checked. In this example, since it is designated that the user name is to be checked, then the user name information contained in the transmission identification information stored in the RAM 108 is compared with the registered information held in a previously set check list as illustrated in FIG. 5 (user name check list in FIG. 5A), and if it matches a registered user name, then prescribed sorting processing is carried out in accordance with the sort category registered in the same check list. In this example, if the user name matches "Nakata", then the document is transferred to the Confidential Box "001", or the like. Furthermore, if the user name matches "Toda", then the document is transferred to the output device "Side Tray". Furthermore, if the user name matches "Ono", then processing for transferring the document to a PC (transfer destination Main: Internet HP Address: XXXXX) is carried out on the basis of control performed by the PC document transfer control unit 111*b*. In the method of transfer to a PC (PC transfer), the received fax document is converted to a PDF file, and this file is transferred to the PC by means of FTP (File Transfer Protocol)-RFC959.

At this time, it is also judged, simultaneously, whether or not an incoming fax report is to be performed (step S109). More specifically, this judgement is made by checking whether or not an incoming fax report recipient is registered in the user name check list in FIG. 5A described above.

Thereupon, if it is judged that an incoming fax report is to be issued (YES at step S109), then an incoming fax report is issued to the corresponding report recipient (step S110).

For example, in the example of the user name check list illustrated in FIG. 5A described above, if the user name matches "Ono", then since the information "Report recipient Sub1: Mobile Phone Mail Address:XXXXX" is registered in the incoming fax report recipient, an incoming fax received message is sent by e-mail to the report recipient "XXXXX", on the basis of the control performed by the incoming fax report control unit 111*c*. In this case, the contents reported to the report recipient are, for example, contents such as those illustrated in FIG. 6.

Thereupon, facsimile communication processing for the received job is completed in the composite device 100.

Moreover, if, on the other hand, it is judged that sorting processing is not to be carried out on the basis of the judgement at step S107 described above (NO at step S107), then normal reception processing is carried out (step S111).

Thereupon, facsimile communication processing for the received job is completed in the composite device 100.

The check lists illustrated in FIG. 5 are formed into check lists on the basis or the settings information designated and input by the user by means of settings screens (not illustrated) and they are stored in the RAM 108 as system data.

Since documents received by Internet facsimile communications can be sorted automatically by implementing processing of this kind, it is possible to reduce the work involved until a received document is transferred to the appropriate recipient.

Moreover, work efficiency can be enhanced by making it possible to select a sorting method which is suited to the recipient's working environment. For example, if the other party is one who requires privacy, then sorting to boxes or transfer to a PC is carried out, whereas if the other party is one who does not require privacy, then output to an Output Tray, or Mail Box is implemented.

Furthermore, by issuing an incoming fax report to a mobile device, with respect to required parties, it is possible to save unnecessary work by the recipient, and hence a fast service can be provided to the sender.

(2) Next, processing operations for implementing automatic sorting processing for received documents in an image processing device performing facsimile communications via the Internet, if the urgency of a communication is judged to be high on the basis of the reported transmission identification information, are described with reference to FIG. 7 to FIG. 9.

Figure 7:
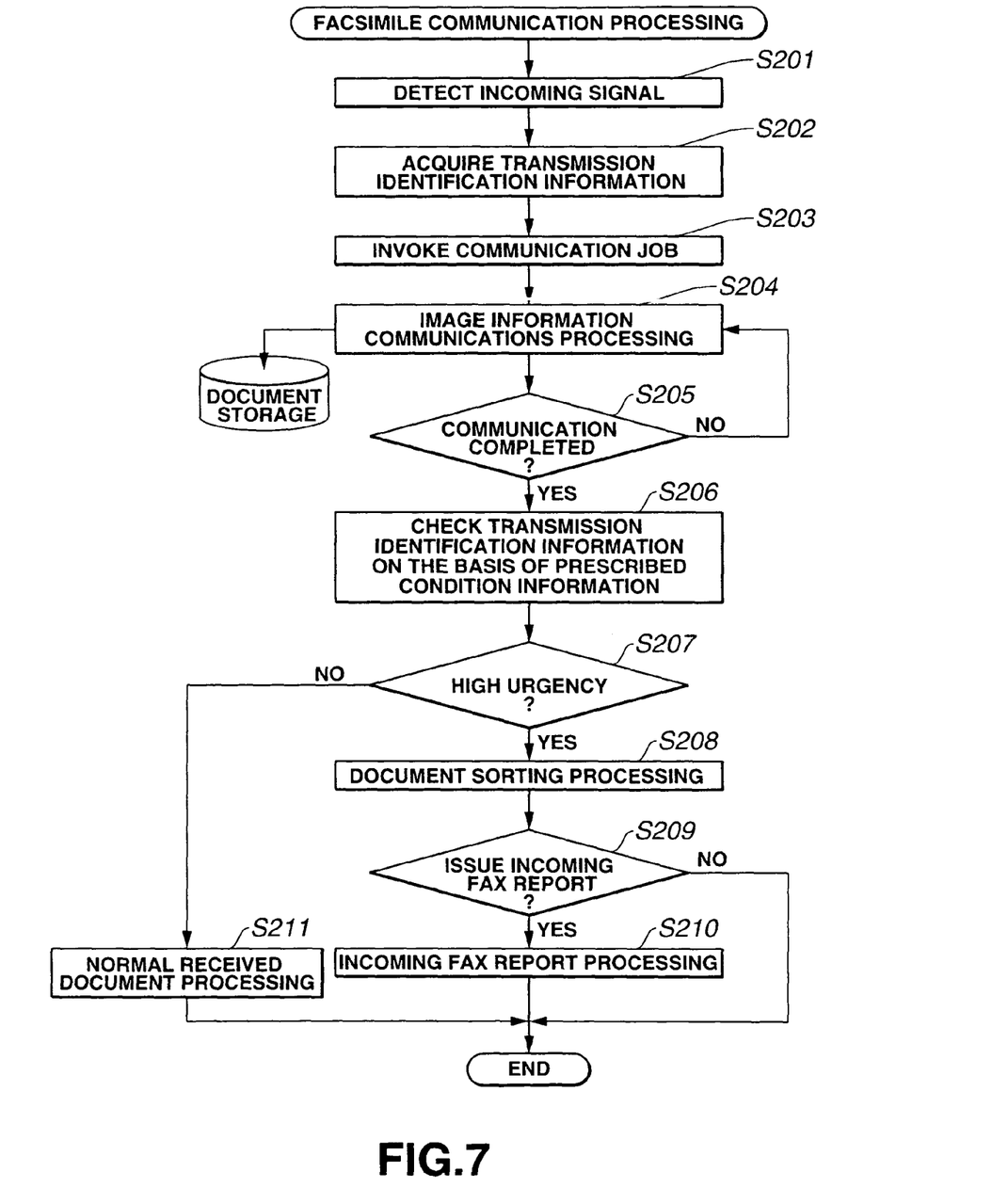
FIG. 7 is a flowchart showing the procedure of processing operations in an image processing device performing facsimile communications, in a case where automatic sorting processing for received documents is carried out if it is judged on the basis of the reported transmission identification information that the communication is of high urgency.

In FIG. 7, in this processing, firstly, when the Internet communication control unit detects an incoming signal (step S201), the reported transmission identification information is analysed and stored in the RAM 107 (step S202). Refer to FIG. 3 for an illustration of a method for extracting the transmission identification information.

Thereupon, the system control unit 106 invokes a communication job (step S203), and image information communication processing is carried out (step S204). In this process, the received document is stored in the image storing unit.

Subsequently, when the communication has completed (YES at step S205), the transmission identification information is checked on the basis of designated condition information, in accordance with control performed by the system control unit 106 (step S206).

If, as a result of this check, it is judged that the communication in question is of high urgency, namely, that it is a highly urgent communication (YES at step S207), then prescribed sorting processing for the document received in that communication is implemented (step S208).

Figure 8:
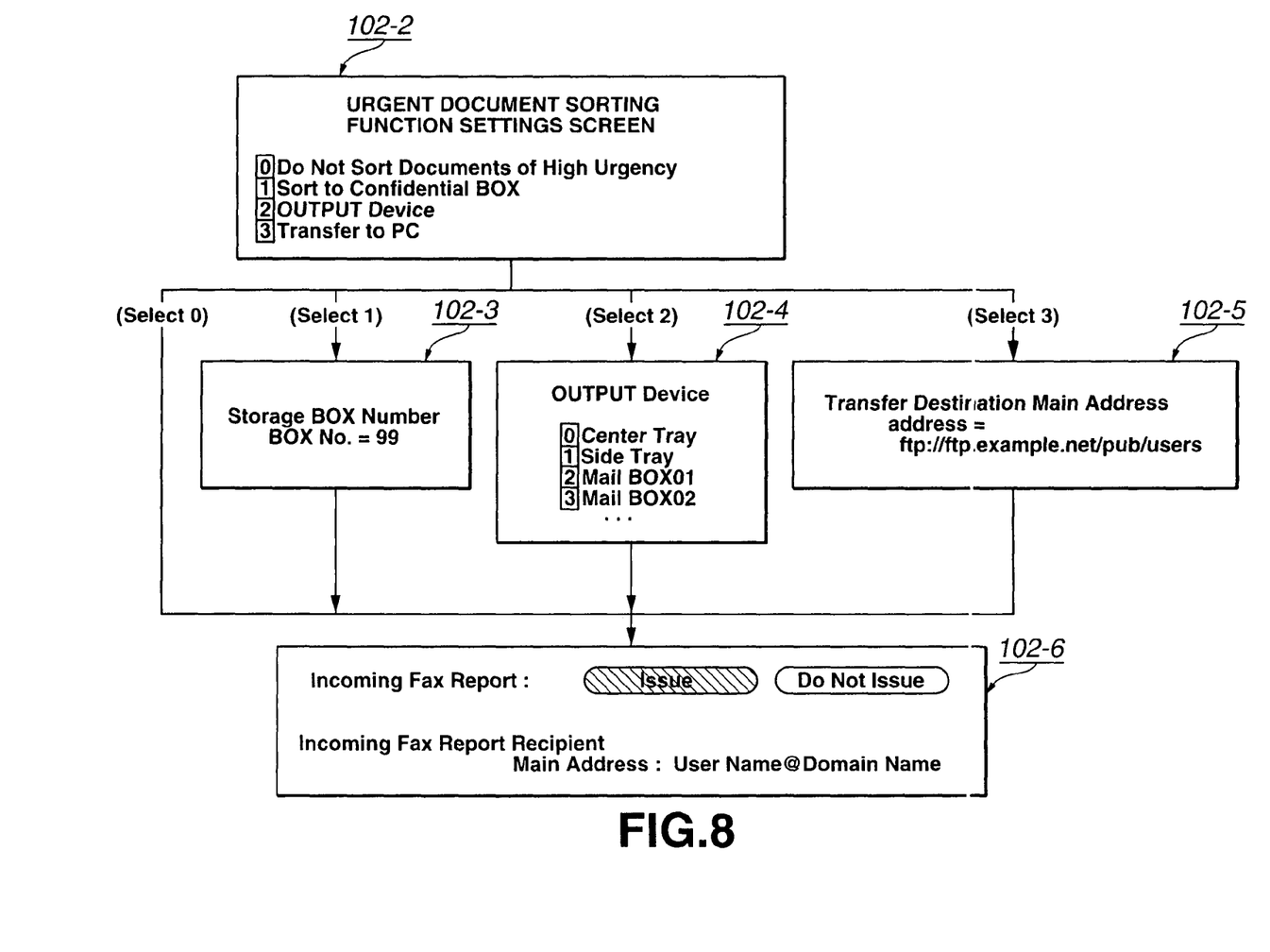
FIG. 8 shows one example of the composition of an "urgent document sorting function setting screen"
Figure 9:
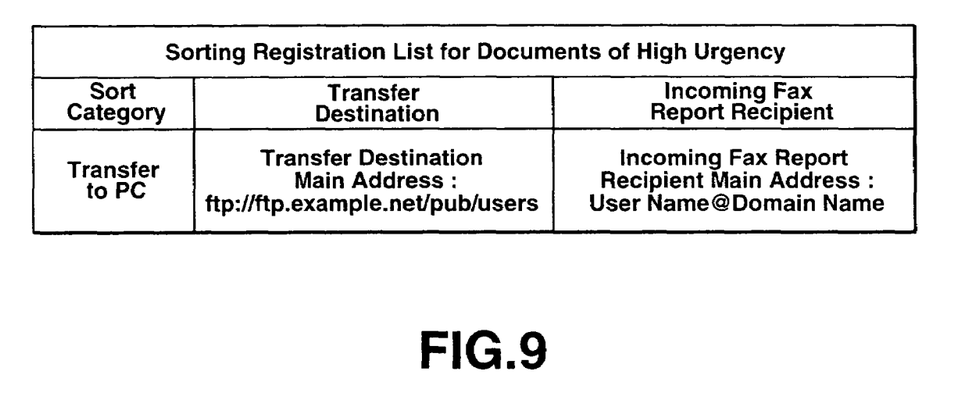
FIG. 9 shows one example of the composition of a sorting registration list for documents of high urgency.

More specifically, prescribed sorting processing, as designated by the user by means of the urgent document sorting function setting screens 102-2 to 102-6 shown in FIG. 8, and registered in the high urgency document sorting registration list illustrated in FIG. 9, is implemented.

In this, it is also judged, simultaneously, whether or not an incoming fax report is to be performed (step S209). More specifically, this judgement is made by checking whether or not an incoming fax report recipient is registered in the registration list in FIG. 9 described above.

Thereupon, if it is judged that an incoming fax report is to be issued (YES at step S209), then an incoming fax report is issued to the corresponding report recipient (step S210).

In the example in FIG. 9 described above, since "3": Transfer to PC is designated on the setting screen 102-2 illustrated in FIG. 8, the transfer destination Main Address: "ftp://ftp.example.net/pub/users" is registered on the setting screen 102-5, the incoming fax report is set to "Issue" on the setting screen 102-6, and the incoming fax report recipient Main Address is registered as "user name @ domain name", then in this case, sort processing for transfer to PC is adopted on the basis of the information registered in the registration list in FIG. 9, and processing for sorting the received document to the transfer destination "ftp://ftp.example.net/pub/users" is implemented, in addition to which, an incoming fax report is issued to the incoming fax report recipient "user name @ domain name".

Thereupon, facsimile communication processing for the received job is completed in the composite device 100.

Moreover, if, on the other hand, it is judged that the communication in question is not of high urgency, on the basis of the judgement at step S207 described above (NO at step S107), then normal reception processing is carried out (step S211).

Thereupon, facsimile communication processing for the received job is completed in the composite device 100.

The example of PC transfer described above related to a case where the received document is transferred as an FTP file to a designated PC, but in addition to this, it is also possible to adopt a variety of methods, such as writing it to a home page on the Internet (automatic registration), or the like. If settings are made so as to allow automatic registration on a home page on the Internet, then, for example, people who are not fully conversant with the use of personal computers, such as people in shopping centres, or the like, can send a fax and have their own personal introduction information written to the home page.

The actual method for judging whether or not the urgency is high in step S207 described above involves checking the Priority information contained in the transmission identification information. In other words, judgement is made on the basis of the Priority, and if the Priority is set to "urgent" or "emergency", then the urgency is judged to be high, whereas if it is set to "non-urgent" or "normal", then the urgency is judged to be low.

Since received documents can be sorted automatically by implementing processing of this kind, it is possible to reduce the work involved until a received document is transferred to the appropriate recipient.

Moreover, an automatic sorting function based on the urgency of the received document promotes rapid processing by the recipient, and leads to an improved service for the sender. For example, a rapid response can be made with respect to applications or enquiries about products which are made by fax.

Moreover, work efficiency can be enhanced by making it possible to select a sorting method which is suited to the recipient's working environment. For example, if the party is one who requires privacy, then sorting to boxes or transfer to a PC is carried out, whereas if the party is one who does not require privacy, then output to an Output Tray, or Mail Box is implemented.

Furthermore, by issuing an incoming fax report to a mobile device, with respect to required parties, it is possible to save unnecessary work by the recipient, and hence a fast service can be provided to the sender. In particular, if the issuing of incoming fax reports to a mobile device is restricted to communications of high urgency only, then it becomes possible to make a swift response to matters which require urgent action.

Next, a case where the processing in (1) above and the processing in (2) above are combined will be described.

Specifically, processing operations in a case where prescribed sorting is implemented if a communication is of high urgency, in addition to which, prescribed sorting is also implemented even if the communication does not have high urgency, in cases where the communication satisfies prescribed conditions upon checking of the contents of the transmission identification information transmitted by the sender, shall be described with reference to FIG. 10.

Figure 10:
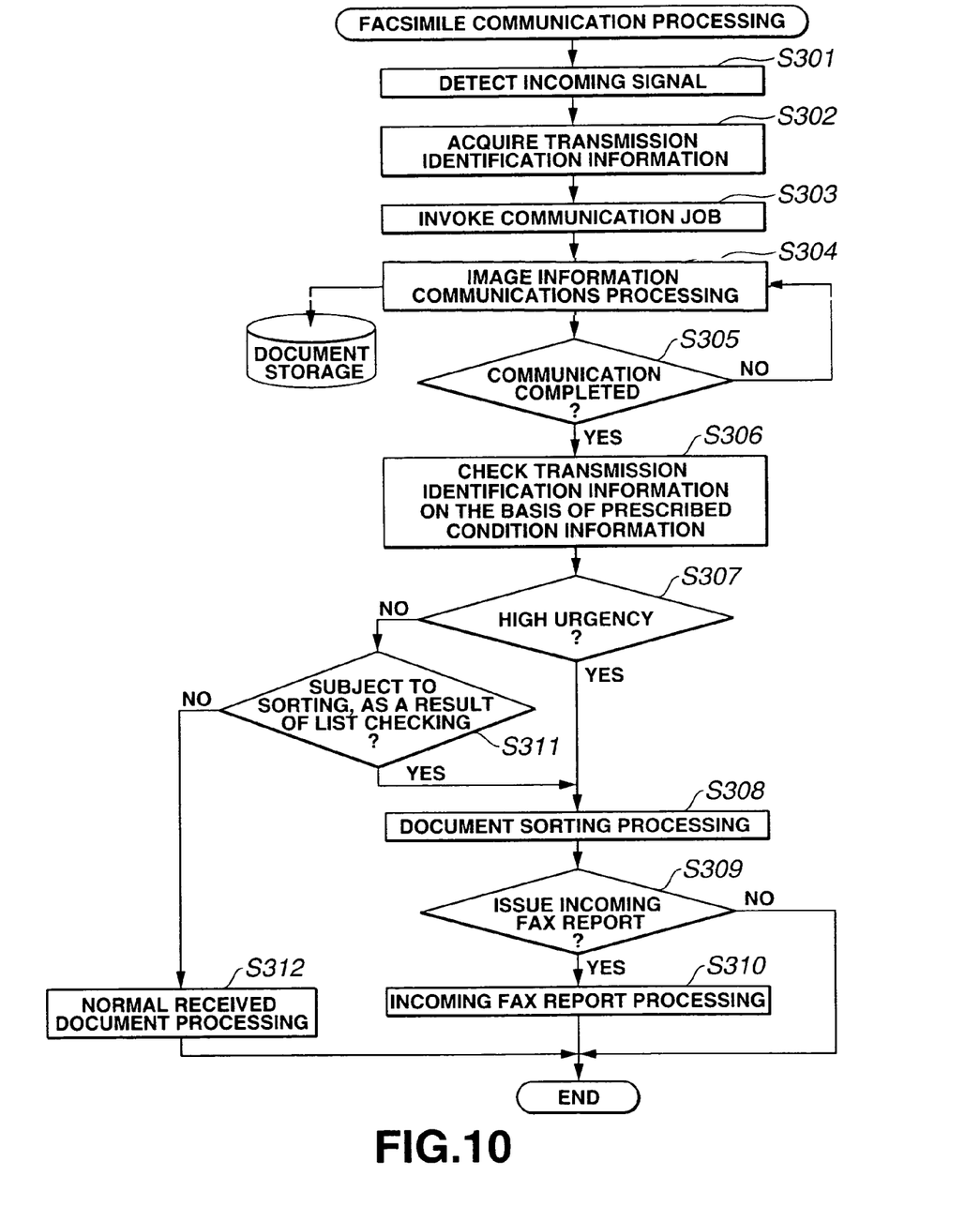
FIG. 10 is a flowchart showing the procedure of processing operations in a case where the processing in FIG. 2 and the processing in FIG. 7 are performed in combination.

In FIG. 10, in this processing, the steps from step S301 to step S305 are similar to the processing in FIG. 2 and FIG. 7 described above, and hence further explanation thereof is omitted here.

Thereupon, when the communication has completed at step S305 (YES at step S305), in this processing, the transmission identification information is checked on the basis of designated condition information, in accordance with control performed by the system control unit 106 (step S306).

Here, firstly, it is judged whether or not the communication is one of high urgency (step S307). If the communication is judged to be of high urgency (YES at step S307), then processing similar to that of step S208 onwards described previously in FIG. 7 is carried out (corresponding to step S308 to step S310, to processing for transfer to standby state).

If, on the other hand, it is judged as a result of the judgement in step S307 above that the communication in question is not of high urgency (NO at step S307), then processing similar to that in step S107 onwards illustrated in FIG. 2 above is implemented (corresponding to step S311 to step S308 to step S309 to step S310 and to completion of facsimile communication processing for received job, or step S311 to step S312 and to completion of facsimile communication processing for received job.)

In other words, by implementing processing of this kind, if it is judged as a result of checking the transmission identification information transmitted by the sender that the communication is not one of high urgency, then the transmission identification information is checked on the basis of other prescribed condition list information, and if the communication is one to which sorting processing is applicable, then prescribed sorting processing as registered and designated previously by the user can be carried out, and hence automatic sorting processing can be performed in respect of faxes from parties approved by the user.

Furthermore, the composite device 100 illustrated in FIG. 1 described above has a G3 FAX communication control unit 112 and a G4 FAX communication control unit 113, but the composition is not limited to this, and, it is also possible for the G3 FAX communication control unit 112 and the G4 FAX communication control unit 113 to be omitted.

What is claimed is:

1. A received document sorting control method for an image processing device that has an Internet facsimile communication unit for controlling internet facsimile communications via Internet, comprising:

extracting transmission identification information which a document received through the Internet facsimile communications corresponds to and which is transmitted by a sender;

registering a type of sorting and destination of sorting when an automatic sorting of the received document is performed corresponding to each of the items contained in the transmission identification information;

receiving designation for one of the items contained in the transmission identification information;

judging that the received document is a document which is subject to the automatic sorting if the transmission identification information extracted in the extracting of transmission identification information contains the item for which the designation is received in the receiving of designation, and the type of sorting and the destination of sorting are registered corresponding to the item in the registering of type and destination of sorting; and controlling an automatic sorting process that sorts the received document to the destination of sorting in accordance with the type of sorting if the received document is judged to be the document which is subject to the automatic sorting in the judging.

2. The received document sorting control method according to claim 1, wherein implementation or non-implementation of automatic sorting, and the type of sorting and destination of sorting in the case that automatic sorting is to be implemented, are registered in accordance with a user name, a telephone number, a domain name, and an organization name to which a sender device belongs, as contained in the transmission identification information.

3. The received document sorting method according to claim 1, wherein any one sorting method is registered from among sorting to a previously designated confidential box, sorting to a previously designated output device, such as an output tray or a mail box, or the like, or sorting for transfer to a previously designated personal computer.

4. The received document sorting control method according to claim 1, wherein in addition to registering the type of sorting and the destination of sorting, it is also registered whether or not incoming facsimile communication reporting is to be carried out with respect to a prescribed report recipient.

5. A received document sorting control method for an image processing device that has an Internet facsimile communication unit for controlling Internet facsimile communications via Internet, comprising:

extracting transmission identification information which a document received through the Internet facsimile communications corresponds to and which is transmitted by a sender;

registering a type of sorting and destination of sorting when an automatic sorting of the received document is performed corresponding to urgency degree information contained in the transmission identification information; and outputting the received document to the destination of sorting in accordance with the type of sorting registered in the registering of type and destination of sorting if the transmission identification information extracted in the extracting of transmission identification information contains the urgency degree information and if it is judged that the received document is a document of high urgency based on the urgency degree information.

6. The received document sorting method according to claim 5, wherein any one sorting method is registered from among sorting to a previously designated confidential box, sorting to a previously designated output device, such as an output tray or mail box, or the like, or sorting for transfer to a previously designated personal computer.

7. The received document sorting control method according to claim 5, wherein in addition to registering the type of sorting and the destination of sorting, it is also registered whether or not incoming facsimile communication reporting is to be carried out with respect to a prescribed report recipient.

8. A received document sorting control method for an image processing device that has an Internet facsimile communication unit for controlling Internet facsimile communications via Internet comprising:

extracting transmission identification information which a document received through the Internet facsimile communications corresponds to and which is transmitted by a sender;

registering a type of sorting and destination of sorting when an automatic sorting of the received document is performed corresponding to each of the items contained in the transmission identification information, and registering a type of sorting and destination of sorting when an automatic sorting of the received document is performed corresponding to urgency degree information contained in the transmission identification information;

receiving designation for one of the items contained in the transmission identification information;

judging that the received document is a document which is subject to the automatic sorting if the transmission identification information extracted and the extracting of transmission identification information contains the item for which the designation is received in the receiving of destination, and the type of sorting and the destination of sorting are registered corresponding to the item in the registering of type and the destination of sorting; and controlling an automatic sorting process that sorts the received document to the destination of sorting in accordance with the type of sorting if the received document is judged to be in the document which is subject to the automatic sorting in the judging, and outputting the received document to the destination of sorting in accordance with the type of sorting registered if the transmission identification information extracted in the extracting of transmission identification information contains the urgency degree information and if it is judged that the received document is a document of high urgency based on the urgency degree information.

9. The received document sorting control method according to claim 8, wherein implementation or non-implementation of automatic sorting, and the type of sorting and the destination of sorting in the case that automatic sorting is to be implemented, are registered in accordance with the user name, telephone number, domain name, and organization name to which the sender device belongs, as contained in the transmission identification information.

10. The received document sorting method according to claim 8, wherein any one sorting method is registered from among sorting to a previously designated confidential box, sorting to a previously designated output device, such as an output tray or mail box, or the like, or sorting for transfer to a previously designated personal computer.

11. The received document sorting control method according to claim 8, wherein in addition to registering the type of sorting and the destination of sorting, it is also registered whether or not incoming facsimile communication reporting is to be carried out with respect to a prescribed report recipient.

12. An image processing device, comprising:

a transmission identification information extracting unit that extracts transmission identification information which a document received through the Internet facsimile communications corresponds to and which is transmitted by a sender;

a registering unit that registers a type of sorting and destination of sorting when an automatic sorting of the received document is performed corresponding to each of the items contained in the transmission identification information;

a receiving unit that receives a designation for one of the items contained in the transmission identification information;

a judging unit that judges that the received document is a document which is subject to the automatic sorting if the transmission identification information extracted in the transmission identification information extracting unit contains the item for which the designation is received in the receiving unit, and the type of sorting and the destination of sorting are registered corresponding to the item in the registering unit; and a received document sorting control unit that controls an automatic sorting process that sorts the received document to the destination of sorting in accordance with the type of sorting if the received document is judged to be the document which is subject to the automatic sorting and the judging unit.

13. The image processing device according to claim 12, wherein the registering unit registers implementation or non-implementation of automatic sorting, and the type of sorting and the destination of sorting in the case that automatic sorting is to be implemented, in accordance with a user name, a telephone number, a domain name, and an organization name to which a sender device belongs, as contained in the transmission identification information.

14. The image processing device according to claim 12, wherein the registering unit registers any one from among sorting to a previously designated confidential box, sorting to a previously designated output device, such as an output tray or mail box, or the like, or sorting for transfer to a previously designated personal computer.

15. The image processing device according to claim 12, wherein the registering unit, in addition to registering the type of sorting and the destination of sorting, also registers whether or not incoming facsimile communication reporting is to be carried out with respect to a prescribed report recipient.

16. An image processing device, comprising:
a transmission identification information extracting unit that extracts transmission identification information which a document received through the Internet facsimile communications corresponds to and which is transmitted by a sender;

a registering unit that registers a type of sorting and destination of sorting when an automatic sorting of the received document is performed corresponding to urgency degree information contained in the transmission identification information; and a received document sorting control unit that outputs the received document to the destination of sorting in accordance with the type of sorting registered in the registering unit if the transmission identification information extracted in the transmission identification information extracting unit contains the urgency degree information and if it is judged that the received document is a document of high urgency based on the urgency degree information.

17. The image processing device according to claim 16, wherein the registering unit registers any one sorting method from among sorting to a previously designated confidential box, sorting to a previously designated output device, such as an output tray or mail box, or the like, or sorting for transfer to a previously designated personal computer.

18. The image processing device according to claim 16, wherein the registering unit, in addition to registering the type of sorting and the destination of sorting, also registers whether or not incoming facsimile communication reporting is to be carried out with respect to a prescribed report recipient.

19. An image processing device, comprising:
an Internet facsimile communication unit that controls Internet facsimile communications via Internet;

a transmission identification information extracting unit that extracts transmission identification information which a document received through the Internet facsimile communications corresponds to which is transmitted by a sender;

a registering unit that registers a type of sorting and destination of sorting when an automatic sorting of the received document is performed corresponding to each of items contained in the transmission identification information, and registering a type of sorting and destination of sorting when an automatic sorting of the received document is performed corresponding to urgency degree information contained in the transmission identification information;

a receiving unit that receives designation for one of the items contained in the transmission identification information;

a judging unit that judges that the received document is a document which is subject to the automatic sorting if the transmission identification information extracted in the transmission identification information extracting unit contains the item for which the designation is received in the receiving unit, and the type of sorting and the destination of sorting are registered corresponding to the item in the registering unit; and a received document sorting control unit that controls an automatic sorting process that sorts the received document to the destination of sorting in accordance with the type of sorting if the received document is judged to be the document which is subject to the automatic sorting and the judging unit, and outputting the received document to the destination of sorting in accordance with the type of sorting registered in the registering unit if the transmission identification information extracted and the transmission identification information extracting unit contains the urgency degree information and if it is judged that the received document is a document of high urgency based on the urgency degree information.

20. The image processing device according to claim 19, wherein the registering unit registers implementation or non-implementation of automatic sorting, and the type of sorting and the destination of sorting used in the case that automatic sorting is to be implemented, in accordance with a user name, a telephone number, a domain name, and an organization name to which a sender device belongs, as contained in the transmission identification information.

21. The image processing device according to claim 19, wherein the registering unit registers any one sorting method from among sorting to a previously designated confidential box, sorting to a previously designated output device, such as an output tray or mail box, or the like, or sorting for transfer to a previously designated personal computer.

22. The image processing device according to claim 19, wherein the registering unit, in addition to registering the type of sorting and the destination of sorting, also registers whether or not incoming facsimile communication reporting is to be carried out with respect to a prescribed report recipient.

* * * * *